United States Patent [19]

Massie

[11] 4,346,999
[45] Aug. 31, 1982

[54] DIGITAL HETERODYNE WAVEFRONT ANALYZER

[75] Inventor: Norbert A. Massie, Westlake Village, Calif.

[73] Assignee: Rockwell International Corporation, El Segundo, Calif.

[21] Appl. No.: 191,604

[22] Filed: Sep. 29, 1980

[51] Int. Cl.³ .............................................. G01B 9/02
[52] U.S. Cl. ..................................... 356/349; 356/351
[58] Field of Search ............... 356/349, 351, 359, 360, 356/361

[56] References Cited

U.S. PATENT DOCUMENTS

| | | | |
|---|---|---|---|
| 3,857,636 | 12/1974 | Angelbeck | 356/349 |
| 4,018,531 | 4/1977 | Leendentz | 356/360 |
| 4,188,122 | 2/1980 | Massie et al. | 356/349 |

Primary Examiner—John K. Corbin
Assistant Examiner—Matthew W. Koren
Attorney, Agent, or Firm—H. Fredrick Hamann; Harry B. Field

[57] ABSTRACT

There is described a device for analyzing the wavefront of a light beam exiting the laser to detect any aberrations across the cross-sectional area of the beam from a planar wavefront. A rotating wave plate splits the beam from the laser into two orthogonally polarized beams separated in frequency by a frequency difference in the audio range. A polarization selective interferometer directs these two beams along a test arm and a reference arm. Quarterwave plates in each arm convert the outgoing waves to circular polarization and the return waves back to linear polarization but orthogonal to the input polarization. A linear polarizer at the output oriented at a 45° angle to the polarizations causes the waves to interfere and a detector placed at any point in the output beam detects a beat signal at the audio frequency. The reference beam and the interferometer reference arm is made to produce a planar wavefront by passing the beam through a pinhole that is small enough to remove the aberrations existing on the incoming beam from the laser.

9 Claims, 1 Drawing Figure

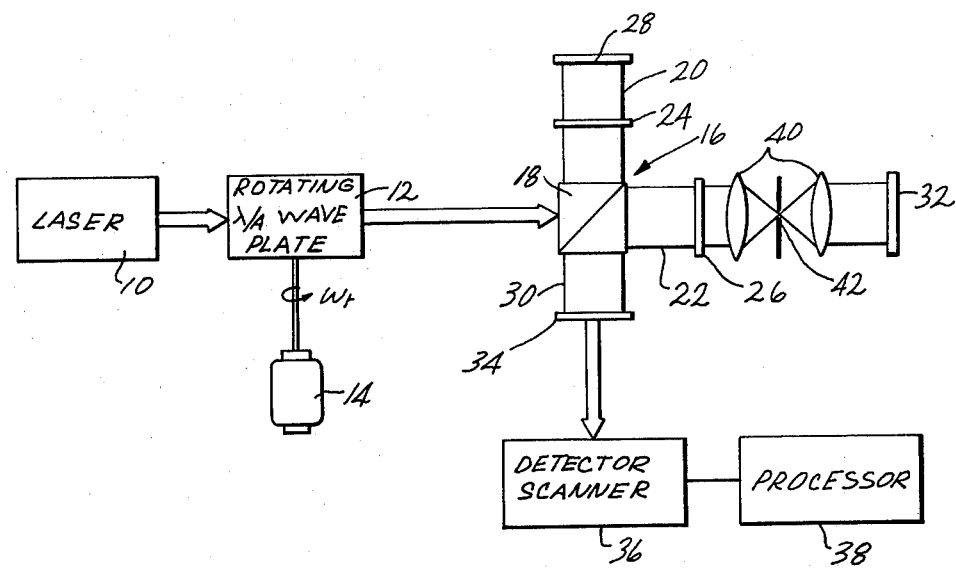

DIGITAL HETERODYNE WAVEFRONT ANALYZER

FIELD OF THE INVENTION

This invention relates to light beam wave front analyzers, and more particularly, to a wave front analyzer using an interferometer to form an interference pattern showing wavefront aberrations.

BACKGROUND OF THE INVENTION

In U.S. Pat. No. 4,188,122 there is described a digital heterodyne interferometer which is useful in a analyzing the surface contour of a mirror, for example, utilizing a Twymann-Green interferometer. A test beam entering the interferometer is separated into two components which differ in frequency by a very small amount, e.g., a few KHz. The two components have different polarizations for purposes of identification. After passing through the interferometer, the components are processed to provide of the same polarization so that the components, after passing through the interferometer are permitted to interfere. Interference fringes can be observed either visually or electronically in a plane intersecting the output beam of the interferometer. Interference fringes move in a direction perpendicularly to their extensions at a rate equal to the difference frequency of the two input components to the interferometer. Thus the light intensity oscillates at any point in the detection plane at the difference frequency. The phase at any point in the detection plane is directly proportional to the optical path difference between the two arms of the interferometer, which in turn is due to imperfections or aberrations in the surface of the mirror being tested relative to a reference mirror surface.

The present invention utilizes this heterodyne interferometer concept to analyze aberrations in the wavefront of a beam being tested or analyzed by measuring phase variations from point to point in a detection plane at the output of the interferometer. The heterodyne wavefront analyzer of the present invention is a passive device requiring only a wavefront to be received.

SUMMARY OF THE INVENTION

In brief, the present invention provides a wavefront analyzer which receives a light beam from a laser, for example. The laser emits a wavefront of some phase front $\phi(x,y)$ where x and y are the coordinates in a plane transverse to the axis of the beam. The beam being analyzed is first passed through a rotating waveplate which splits the beam into two orthogonally polarized components separated in frequency by frequency difference equal to the rotational frequency of the waveplate. The two components are directed into a polarization selective Twymann-Green interferometer which directs the two components along two mutually perpendicular arms of the interferometer. Quarterwave plates in each arm convert the outgoing beam components to circular polazization, and the return will reflect the components back to linear polarization but orthogonal to the input polarization. Thus, these beams can exit through the polarizing beam splitter in a lossless fashion. At the detection plane a linear polarizer oriented 45° to each polarization causes the beams to interfere. A plurality of detectors can be placed then at this output plane and each will have an AC signal at the rotation frequency of the quarterwave plate. The phase of this AC signal will be a measure of $\phi(x,y)$ at the local detector.

To detect variations in the wavefront, the reference arm of the interferometer must produce a return beam that has a planar wavefront. This is achieved by providing a pair of condensing lenses with a pinhole at the common focus between the two lenses in the reference arm of the interferometer. The pinhole is small enough to strip away the aberrations on the beam.

BRIEF DESCRIPTION OF THE DRAWING

For a better understanding of the invention reference should be made to the accompanying drawing, wherein, the single FIGURE is a schematic block diagram of the invention.

DETAILED DESCRIPTION

Referring to the drawing in detail, the numeral 10 indicates a laser or other source of energy which produces a wavefront that is nominally planar but which may have undesirable phase aberrations. To analyze these aberrations, the beam from the laser is directed to a heterodyne wavefront analyzer which includes a rotating quarterwave plate 12 for receiving the input beam from the laser. The quarterwave plate is rotated mechanically, for example, by a motor 14 at an angular velocity $\omega_r$. The rotating quarterwave plate has the effect of splitting the beam into two components which are orthogonally polarized with respect to each other and are separated in frequency by an amount $$\Delta f = \omega_r$$

These two components are directed from the rotating wave plate to the input of an interferometer, indicated generally at 16. The interferometer is of conventional design, such as a Twymann-Green interferometer, and includes a polarization selective beam splitter 18 which directs the incoming beam along two mutually perpendicular paths. One path and one polarization is directed along what is commonly referred to as a test arm 20 while the other beam and other polarization is directed along a reference arm 22. Each arm includes a quarterwave plate, indicated at 24 and 26, respectively. A mirror 28 at the end of the test arm 20 reflects the incident beam back along the same path through the beam splitter 18 and along the output arm 30. Similarly, a mirror 32 at the end of the reference arm 22 is reflected back to the beam splitter and also is directed out the output arm 30. The quarterwave plates in each arm convert the outgoing light waves in each arm to circular polarization and the return waves reflected back by the mirrors 28 and 32 to linear polarization but orthogonal to the input polarization. Thus the output beam from the beam splitter 18 has two components which are linearly polarized at right angles to each other. A linear polarizer 34 in the output arm 30 of the interferometer is oriented at a 45° angle with respect to the two components. Thus the linear polarizer causes the two components of the output beam to interfere with each other.

The output beam is directed at a detector/scanner 36 (or detector array) which operates to move a detector in a predetermined scanning pattern in a plane perpendicular to the output beam. The detector placed at any point in the output beam detects a beat signal at the frequency difference $\omega_r$. The output of the detector/scanner can be digitized and processed in a manner described in detail in the article entitled "Real-Time Digital Heterodyne Interferometry: a System" by N. A. Massie, *Applied Optics,* Vol. 19, No. 2, Jan. 1, 1980.

In order for the above system to provide output information which is related to phase discrepancies in the wavefront of the laser 10, it is necessary that the reference arm produce a reference beam having a planar wavefront so that any interferences produced between the beam from the test arm and the reference arm are the result of aberrations in the wavefront of the beam from the test arm only. This is accomplished, according to the present invention, by passing the beam in the reference arm 22 through a pair of condenser lenses 40 which focus the beam on a pinhole 42 positioned at the focal point of the condensing lenses 40. By making the pinhole small enough, it operates to strip away the phase aberrations on the beam in the reference arm, causing the return beam to have a wavefront that is quite planar. Interference between this planar wave and the wavefront from the test arm 20 permits the detector to map the phase of the beat signal on the output beam, thus producing an optical path difference (OPD) map of the wavefront from the laser source.

It is to be understood that what has been described is merely illustrative of the principles of the invention and that numerous arrangements in accordance with this invention may be devised by one skilled in the art without departing from the spirit and scope thereof.

What is claimed is:

1. Apparatus for analyzing the wavefront of a laser light beam comprising: means splitting the light beam into two components polarized orthogonally, means shifting the frequency of one of said two components relative to the other by a small amount, a polarization selective interferometer including means directing both beam components along two separate paths, mirror means along each path reflecting said two beams back along said two paths, and means directing the two reflected beams along a common output path, means along the common output path for producing an interference pattern between the two output beams, detector means for scanning the light in a plane perpendicular to the two output beams, and means for converting the reflected beam travelling along one of said two separate paths into a planar wavefront for subsequent interference with the beam travelling along the other one of said separate paths.

2. Apparatus of claim 1 wherein said means for generating a planar wave front includes pinhole means and lens means for focusing the beam on the pinhole.

3. Apparatus of claim 1 wherein said means for the light beam includes a rotating quarterwave plate.

4. Apparatus of claim 3 wherein said means for producing an interference path includes a polarizer.

5. A wavefront analyzer comprising an interferometer including a beam splitter for directing an incoming beam along two paths, mirror means for reflecting the beams along said two paths back to the beam splitter, the beam splitter directing the beam along a common output path, a quarterwave plate along each of said two paths between the beam splitter and the mirror means, a polarizer along the output path of the interferometer, means detecting variations in light level in the output from the polarizer, and means for converting the reflected wave travelling along one of said two paths into a plannar wavefront for subsequent interference with the wave travelling along the other one of said two paths.

6. Apparatus of claim 5 wherein said last-named means includes a pair of spaced condensing lenses having a common focal point and means forming a pinhole aperture at said common focal point.

7. Apparatus of claim 5 including means at the input to the interferometer for splitting the input beam into two orthogonally polarized components.

8. Apparatus of claim 7 including means for shifting the frequency of one of said components relative to the other component.

9. Apparatus of claim 5 including a rotating quarterwave plate at the input to the interferometer for splitting the incoming beam into two orthogonally polarized components.

* * * * *